United States Patent
Basati et al.

(10) Patent No.: US 12,458,738 B2
(45) Date of Patent: Nov. 4, 2025

(54) INTRAPERITONEAL PRESSURE ("IPP") MEASUREMENT METHODS, APPARATUSES, AND SYSTEMS

(71) Applicants: BAXTER INTERNATIONAL INC., Deerfield, IL (US); BAXTER HEALTHCARE SA, Glattpark (CH)

(72) Inventors: Sukhraaj Basati, Bartlett, IL (US); Jorge Augusto Del Castillo, Des Plaines, IL (US); Joanna Rita Yanaga, Arlington Heights, IL (US); Chris John Grivas, Crystal Lake, IL (US); John Sterling Norman, Gurnee, IL (US)

(73) Assignees: Baxter International Inc., Deerfield, IL (US); Baxter Healthcare SA, Glattpark (CH)

(*) Notice: Subject to any disclaimer, the term of this patent is extended or adjusted under 35 U.S.C. 154(b) by 945 days.

(21) Appl. No.: 17/517,853

(22) Filed: Nov. 3, 2021

(65) Prior Publication Data

US 2022/0133971 A1    May 5, 2022

Related U.S. Application Data

(60) Provisional application No. 63/109,635, filed on Nov. 4, 2020.

(51) Int. Cl.
    *A61M 1/28*    (2006.01)
(52) U.S. Cl.
    CPC .......... *A61M 1/282* (2014.02); *A61M 1/285* (2013.01); *A61M 2205/3303* (2013.01); *A61M 2205/332* (2013.01); *A61M 2205/3344* (2013.01); *A61M 2205/3382* (2013.01); *A61M 2230/06* (2013.01); *A61M 2230/30* (2013.01); *A61M 2230/40* (2013.01); *A61M 2230/63* (2013.01)

(58) Field of Classification Search
    CPC .............. A61M 1/282; A61M 1/285; A61M 2205/3303; A61M 2205/332; A61M 2205/3344; A61M 2205/3382; A61M 2230/06; A61M 2230/30; A61M 2230/40; A61M 2230/63
    See application file for complete search history.

(56) References Cited

U.S. PATENT DOCUMENTS

| | | | | |
|---|---|---|---|---|
| 6,129,699 A | * | 10/2000 | Haight | A61M 5/14232 417/477.2 |
| 2010/0004590 A1 | * | 1/2010 | Hedmann | A61M 1/28 604/29 |
| 2018/0117234 A1 | * | 5/2018 | Neftel | A61M 1/282 |

* cited by examiner

*Primary Examiner* — John Kim
(74) *Attorney, Agent, or Firm* — K&L Gates LLP

(57) ABSTRACT

An intraperitoneal pressure ("IPP") measurement apparatus is disclosed herein. In an example, the IPP measurement apparatus includes a transfer set or catheter that is fluidly coupled to a patient's peritoneal cavity and a pressure sensor adapted to contact the transfer set or catheter. The pressure sensor is configured to transmit output data indicative of an IPP within the patient's peritoneal cavity. The pressure sensor includes a pressure element configured to measure a pressure imparted by a fluid within the transfer set or catheter. The pressure sensor also includes a pressure amplifier having a first side that contacts a portion of the transfer set or catheter and a second side that contacts the pressure element. The first side has a greater diameter or surface area compared to the second side for amplifying the pressure signal for the IPP measurement.

11 Claims, 13 Drawing Sheets

INTRAPERITONEAL PRESSURE ("IPP") MEASUREMENT METHODS, APPARATUSES, AND SYSTEMS

PRIORITY CLAIM

This application claims priority to and the benefit as a non-provisional application of U.S. Provisional Patent Application No. 63/109,635, filed Nov. 4, 2020, the entire contents of which are hereby incorporated by reference and relied upon.

BACKGROUND

Due to various causes, a person's renal system can fail. Renal failure produces several physiological derangements. For instance, it is no longer possible for a person with renal failure to balance water and minerals or to excrete daily metabolic load. Additionally, toxic end products of metabolism, such as, urea, creatinine, uric acid and others, may accumulate in a patient's blood and tissue.

Reduced kidney function and, above all, kidney failure is treated with dialysis. Dialysis removes waste, toxins and excess water from the body that normal functioning kidneys would otherwise remove. Dialysis treatment for replacement of kidney functions is critical to many people because the treatment is lifesaving.

One type of kidney failure therapy is peritoneal dialysis ("PD"), which infuses a dialysis solution, also called dialysis fluid or PD fluid, into a patient's peritoneal cavity via a catheter. The dialysis fluid contacts a peritoneal membrane in a patient's peritoneal cavity. Waste, toxins and excess water pass from the patient's bloodstream, through the capillaries in the peritoneal membrane, and into the dialysis fluid due to diffusion and osmosis (i.e., an osmotic gradient occurs across the membrane). An osmotic agent in the dialysis fluid provides the osmotic gradient. Used or spent dialysis fluid is drained from the patient, removing waste, toxins, and excess water from the patient. This cycle is repeated multiple times for a patient.

There are various types of peritoneal dialysis therapies, including continuous ambulatory peritoneal dialysis ("CAPD"), automated peritoneal dialysis ("APD"), tidal flow dialysis, and continuous flow peritoneal dialysis ("CFPD"). CAPD is a manual dialysis treatment. Here, the patient manually connects an implanted catheter to a drain line to enable used or spent dialysis fluid to drain from the peritoneal cavity. The patient then switches fluid communication so that the patient catheter communicates with a bag of fresh dialysis fluid to infuse the fresh dialysis fluid through the catheter and into the patient. The patient disconnects the catheter from the fresh dialysis fluid bag and allows the dialysis fluid to dwell within the peritoneal cavity, where the transfer of waste, toxins and excess water takes place. After a dwell period, the patient repeats the manual dialysis procedure, for example, four times per day. Manual peritoneal dialysis requires a significant amount of time and effort from the patient, leaving ample room for improvement.

Automated peritoneal dialysis ("APD") is similar to CAPD in that the dialysis treatment includes drain, fill, and dwell cycles. APD machines, however, perform the cycles automatically, typically while the patient sleeps. APD machines free patients from having to manually perform the treatment cycles and from having to transport supplies during the day. APD machines connect fluidly to an implanted catheter, to a source or bag of fresh dialysis fluid, and to a fluid drain. APD machines pump fresh dialysis fluid from a dialysis fluid source, through the catheter and into the patient's peritoneal cavity. APD machines also allow for the dialysis fluid to dwell within the chamber and for the transfer of waste, toxins, and excess water to take place. The source may include multiple liters of dialysis fluid including several solution bags.

APD machines pump used or spent dialysate from the patient's peritoneal cavity, though the catheter, and to the drain. As with the manual process, several drain, fill, and dwell cycles occur during dialysis. A "last fill" may occur at the end of the APD treatment. The last fill fluid may remain in the peritoneal cavity of the patient until the start of the next treatment, or may be manually emptied at some point during the day.

Oftentimes, a clinician determines certain parameters that specify how a PD treatment is to be administered. For instance, a clinician may specify a fill volume parameter that defines an amount of dialysis fluid that is to be provided into a patient's peritoneal cavity during fill phases of a treatment cycle. A clinician may also specify a drain parameter, which defines how much used or spent dialysate (and ultrafiltrate) is to be removed during drains. A clinician may further specify a dwell parameter that defines a duration of time during which the dialysis fluid is to remain in the patient's peritoneal cavity. For many treatments, a clinician may also prescribe a certain concentration of dextrose for the dialysis fluid to achieve certain treatment objectives.

While all of the above-parameters are important for a PD treatment, the fill volume parameter can be critical. If the fill volume parameter is too high, a patient can become overfilled during treatment, leading to discomfort. If the fill volume parameter is too low, the PD treatment may be less effective at removing accumulated toxins. Currently, many clinicians estimate the fill volume parameter using measurements of a patient's intraperitoneal pressure ("IPP"), which is a measure of pressure in a patient's peritoneal cavity as a result of accumulated fluid and waste products. Generally, a patient's IPP increases as a fluid volume increases. A fill volume may be determined as an amount of PD fluid provided to a patient's peritoneal cavity that causes the pressure to reach a certain clinically permissible threshold, which is generally between 15 to 20 centimeters ("cm") $H_2O$ (0.213 to 0.284 pounds per square inch ("psig")). In some instances, the volume of a patient's peritoneal cavity is estimated using a patient's height, age, and gender in comparison to population averages for similar individuals. The estimated volume may then be adjusted based on a measured IPP for determining a fill volume parameter for a PD treatment.

For various reasons, IPP measurements may be less than accurate. The relatively low peritoneal pressure makes IPP measurements especially challenging because many pressure sensors provide more accurate measurements above 1.0 psig, which may be greater than some IPP ranges. In some instances, a patient or measuring equipment may be moved during a measurement, which affects IPP measurements. Even slight movements can cause IPP measurements to vary by 20 to 30%. In addition, patient food and beverage consumption in the twenty-four hours leading up to a measurement can affect IPP measurement results.

A need accordingly exists for improved IPP measurement systems and methods.

SUMMARY

Example systems, methods, and apparatuses are disclosed herein for improved intraperitoneal pressure ("IPP") measurements or estimations. In some embodiments, the systems, methods, and apparatuses include a pressure amplifier provided with a pressure sensor that is connected to or otherwise integrated with a transfer set or catheter. The example pressure amplifier includes a first side that contacts the transfer set or catheter and a second side that contacts a pressure sensor element. The first side has a smaller diameter compared to the second side. Pressure imparted on the first side of the amplifier by PD fluid located within the transfer set or catheter is increased in magnitude based on Pascal's law to impart a proportionally greater force on the pressure sensor element. In alternative embodiments, pressure amplification may occur using a different material having greater elasticity than the reminder of the transfer set or catheter. The region with greater elasticity imparts a proportionally greater pressure on a sensor element. The improved pressure measurement enables a clinician to determine a fill volume parameter that is appropriate for a patient.

Additionally or alternatively, in some embodiments, the systems, methods, and apparatuses disclosed herein include a force sensor provided within a pressure sensor housing for measuring IPP. The force sensor may include at least one of an inertial sensor, a gyroscope, and/or an accelerometer for sensing at least one of linear and/or rotational acceleration in one or more axis. The force sensor provides an indication of patient movement and/or pressure sensor movement during an IPP measurement. Data output from the force sensor is used to normalize or adjust IPP measurement data to compensate for any detected patient and/or pressure sensor movement that would otherwise affect IPP measurement results.

Additionally or alternatively, in some embodiments, the systems, methods, and apparatuses disclosed herein include a spirometer for an IPP pressure measurement. The spirometer records a patient's lung capacity as additional amounts of PD fluid are delivered to the patient's peritoneal cavity. The correlation between a patient's lung capacity and IPP for different fill volumes enables a clinician to determine a fill volume parameter using measured lung capacity. In some instances, the spirometer is used with a pressure sensor for providing a more accurate estimation of IPP and/or a fill volume parameter. In other instances, the spirometer is used instead of a pressure sensor for estimating a patient's IPP for determining a fill volume parameter for PD treatments.

Additionally or alternatively, in some embodiments, the systems, methods, and apparatuses disclosed herein include a processor that performs a comparison of IPP measurements to one or more ranges of pressure data to determine if a catheter and/or transfer set is partially blocked or misaligned. During a fill of PD fluid into a patient's peritoneal cavity, detected pressure is compared to the one or more ranges. Detection of IPP data within a certain range may cause an alarm to be provided, prompting a clinician to check the catheter or transfer set. In some instances, IPP measurement data is not accepted until the IPP measurement data during PD fluid fills is within an acceptable range. Further, the processor may be configured to compare the measured IPP data to one or more acceptable ranges to confirm that the IPP measurements correspond to a dwell rather than a PD fluid fill.

Additionally or alternatively, in some embodiments, the systems, methods, and apparatuses disclosed herein include a processor that receives patient information indicative of a patient's urine output, food/beverage intake, heart rate, and/or blood pressure. The patient information may correspond to periods before, during, and/or after the IPP measurement. The processor is configured to use the patient information to adjust a fill volume parameter such that the parameter is not based solely on IPP measurements alone. The patient information includes factors that may affect IPP measurements. For example, a high degree of beverage consumption with low urine output may indicate that a patient is bloated or retaining water, which may cause IPP measurements to be greater in value compared to if the patient had a more normal fluid balance. Accounting for these factors enables a more accurate fill volume to be determined for a patient.

In light of the disclosure set forth herein, and without limiting the disclosure in any way, in a first aspect of the present disclosure, which may be combined with any other aspect, or portion thereof, described herein an intraperitoneal pressure ("IPP") measurement apparatus includes a transfer set or catheter that is fluidly coupled to a patient's peritoneal cavity, and a pressure sensor configured to contact the transfer set or catheter. The pressure sensor is configured to transmit output data indicative of an IPP within the patient's peritoneal cavity. The pressure sensor includes a pressure element configured to measure a pressure imparted by a fluid within the transfer set or catheter, and a pressure amplifier having a first side that contacts a portion of the transfer set or catheter and a second side that contacts the pressure element. The first side has a greater diameter or surface area compared to the second side.

In a second aspect of the present disclosure, which may be combined with any other aspect, or portion thereof, described herein, the first side includes a diameter or surface area that is at least twice a diameter or surface area of the second side to provide a pressure amplification by at least a multiple of two.

In a third aspect of the present disclosure, which may be combined with any other aspect, or portion thereof, described herein, the pressure element includes at least one of a piezoresistive strange gauge, a pressure sensing diaphragm, a capacitive diaphragm, a pressure sensing capsule, or a bourdon tube.

In a fourth aspect of the present disclosure, which may be combined with any other aspect, or portion thereof, described herein, the pressure sensor is formed integrally with the transfer set or catheter.

In a fifth aspect of the present disclosure, which may be combined with any other aspect, or portion thereof, described herein, the pressure sensor is mechanically connected to the transfer set or catheter.

In a sixth aspect of the present disclosure, which may be combined with any other aspect, or portion thereof, described herein, an intraperitoneal pressure ("IPP") measurement system includes a fluid container containing peritoneal dialysis ("PD") fluid, and a transfer set and catheter in fluid communication with the fluid container and configured to fluidly communicate with a patient's peritoneal cavity to enable PD fluid to be provided to the patient's peritoneal cavity. The system also includes a pressure sensor configured to contact the transfer set or the catheter. The pressure sensor is configured to transmit output data indicative of an IPP within the patient's peritoneal cavity. The pressure sensor includes a pressure element configured to measure a pressure imparted by a fluid within the transfer set or catheter, and a pressure amplifier having a first side that contacts a portion of the transfer set or catheter and a second side that contacts the pressure element. The first side has a greater diameter or surface area compared to the first side. The system further includes a processor communicatively coupled to the pressure sensor. The processor is configured to receive the output data indicative of the IPP within the patient's peritoneal cavity, and at least one of use the output data indicative of the IPP to determine a fill volume parameter for a PD treatment for the patient, or cause the output data indicative of the IPP to be displayed to enable a determination of the fill volume parameter.

In a seventh aspect of the present disclosure, which may be combined with any other aspect, or portion thereof, described herein, the output data indicative of the IPP within the patient's peritoneal cavity corresponds to pressure measurements made by the pressure sensor during dwell intervals between when the PD fluid is provided to and removed from the patient's peritoneal cavity.

In an eighth aspect of the present disclosure, which may be combined with any other aspect, or portion thereof, described herein, the fluid container is placed at a head height, and the system further includes a line clamp that, when closed, occludes a flow of the PD fluid through the transfer set or catheter.

In a ninth aspect of the present disclosure, which may be combined with any other aspect, or portion thereof, described herein, the system further includes a pump configured to move, when activated, the PD fluid from the fluid container through the transfer set and catheter to the patient's peritoneal cavity.

In a tenth aspect of the present disclosure, which may be combined with any other aspect, or portion thereof, described herein, the system further includes an automated peritoneal dialysis ("APD") machine configured to provide the PD treatment for the patient using at least the fill volume parameter.

In an eleventh aspect of the present disclosure, which may be combined with any other aspect, or portion thereof, described herein, the system further includes a force sensor included with the pressure sensor or adapted to contact the transfer set or catheter. The force sensor includes at least one of an inertial sensor, a gyroscope, or an accelerometer for sensing at least one of linear or rotational acceleration in one or more axis. The force sensor is configured to output force data indicative of at least one of patient movement or pressure sensor movement.

In a twelfth aspect of the present disclosure, which may be combined with any other aspect, or portion thereof, described herein, the processor is configured to receive the force data and use the force data to adjust the output data indicative of the IPP to account for measurement components related to at least one of patient movement or pressure sensor movement.

In a thirteenth aspect of the present disclosure, which may be combined with any other aspect, or portion thereof, described herein, the processor is configured to compare the output data indicative of the IPP to at least one data range, when the comparison is outside the at least one data range, provide an indication there is an issue with at least one of the transfer set or the catheter, and when the comparison is within the at least one data range, use the output data indicative of the IPP to determine the fill volume parameter.

In a fourteenth aspect of the present disclosure, which may be combined with any other aspect, or portion thereof, described herein, the processor is configured to receive from the pressure sensor, second output data indicative of pressure during filling of the patient's peritoneal cavity with increasing amounts of the PD fluid, compare the second output data indicative of pressure during the filling of the patient's peritoneal cavity to a second data range, when the comparison is outside the second data range, provide an indication there is an issue with at least one of the transfer set or the catheter, and when the comparison is within the second data range, use the output data indicative of the IPP to determine the fill volume parameter.

In a fifteenth aspect of the present disclosure, which may be combined with any other aspect, or portion thereof, described herein, the processor is configured to receive patient information including at least one or urine output within a defined time period, food/beverage intake within a defined time period, a heart rate, or a blood pressure, and adjust the output data indicative of the IPP or the fill volume parameter using the patient information.

In a sixteenth aspect of the present disclosure, which may be combined with any other aspect, or portion thereof, described herein, the defined time period includes at least one of twenty-four hours or forty-eight hours prior to having the pressure sensor provide the output data indicative of the IPP of the patient.

In a seventeenth aspect of the present disclosure, which may be combined with any other aspect, or portion thereof, described herein, an intraperitoneal pressure ("IPP") measurement system includes a fluid container containing peritoneal dialysis ("PD") fluid, and a transfer set and catheter that is fluidly coupled to the fluid container and a patient's peritoneal cavity to enable PD fluid to be provided to the patient's peritoneal cavity. The system further includes a spirometer for transmitting output data indicative of the patient's lung capacity, and a processor communicatively coupled to the spirometer. The processor is configured to record the output data from the spirometer during dwell intervals between when the PD fluid is provided to and removed from the patient's peritoneal cavity, and use a correlation between lung capacity and IPP to determine at least one of IPP or a fill volume parameter based at least on the output data from the spirometer.

In an eighteenth aspect of the present disclosure, which may be combined with any other aspect, or portion thereof, described herein, the system further includes a pressure sensor adapted to contact the transfer set or the catheter. The pressure sensor is configured to transmit second output data indicative of an IPP within the patient's peritoneal cavity, wherein the processor is configured to use the output data from the spirometer and the second output data from the pressure sensor to determine the fill volume parameter.

In a nineteenth aspect of the present disclosure, which may be combined with any other aspect, or portion thereof, described herein, the fluid container is placed at a head height, and the system further comprises a line clamp that, when closed, occludes a flow of the PD fluid through the transfer set or catheter.

In a twentieth aspect of the present disclosure, which may be combined with any other aspect, or portion thereof, described herein, the system further includes a pump configured to move the PD fluid from the fluid container through the transfer set and catheter to the patient's peritoneal cavity.

In a twenty-first aspect, any of the features, functionality and alternatives described in connection with any one or more of FIGS. 2 to 15 may be combined with any of the features, functionality and alternatives described in connection with any other of FIGS. 2 to 15.

In light of the present disclosure and the above aspects, it is therefore an advantage of the present disclosure to provide improved IPP measurements or estimations.

It is another advantage of the present disclosure to determine a more accurate fill volume parameter for PD treatments.

It is yet another advantage of the present disclosure to consider patient factors and/or movement during IPP measurements to provide adjustments to IPP measurements.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

DETAILED DESCRIPTION

Methods, systems, and apparatuses are disclosed herein for improved intraperitoneal pressure IPP measurements or estimations. The methods, systems, and apparatuses provide a more accurate IPP measurement and/or fill volume estimation compared to known IPP measurement techniques. As described herein, the methods, systems, and apparatuses include one or more of (i) providing a sensor amplifier to amplify pressure sensor measurements to coincide with a more sensitive and precise area of a pressure sensor element, (ii) using a force sensor to adjust for pressure sensor and/or patient movement during an IPP measurement, (iii) using a spirometer to correlate lung capacity with IPP and/or a patient fill volume, (iv) using known ranges to validate IPP measurement data, and/or (v) using urine output data, food/beverage consumption data, blood pressure data, and/or heart rate data to adjust IPP measurements and/or fill volume estimations.

Disclosure is directed herein to performing IPP measurements for determining a fill volume parameter for PD treatments. It should be appreciated that any of the methods, systems, and apparatuses disclosed herein may also be used to measure IPP during a PD treatment. IPP measurements during treatment may be used to stop PD fluid fills when a detected IPP exceeds a threshold, lengthen PD drains, and/or change from a continuous cycling peritoneal ("CCPD") to a tidal therapy if a residual volume in a patient's peritoneal cavity exceeds a threshold. In some instances, IPP measurements that exceed a threshold may trigger an alert for the patient and/or an alert to be communicated to a clinician.

Figure 1:
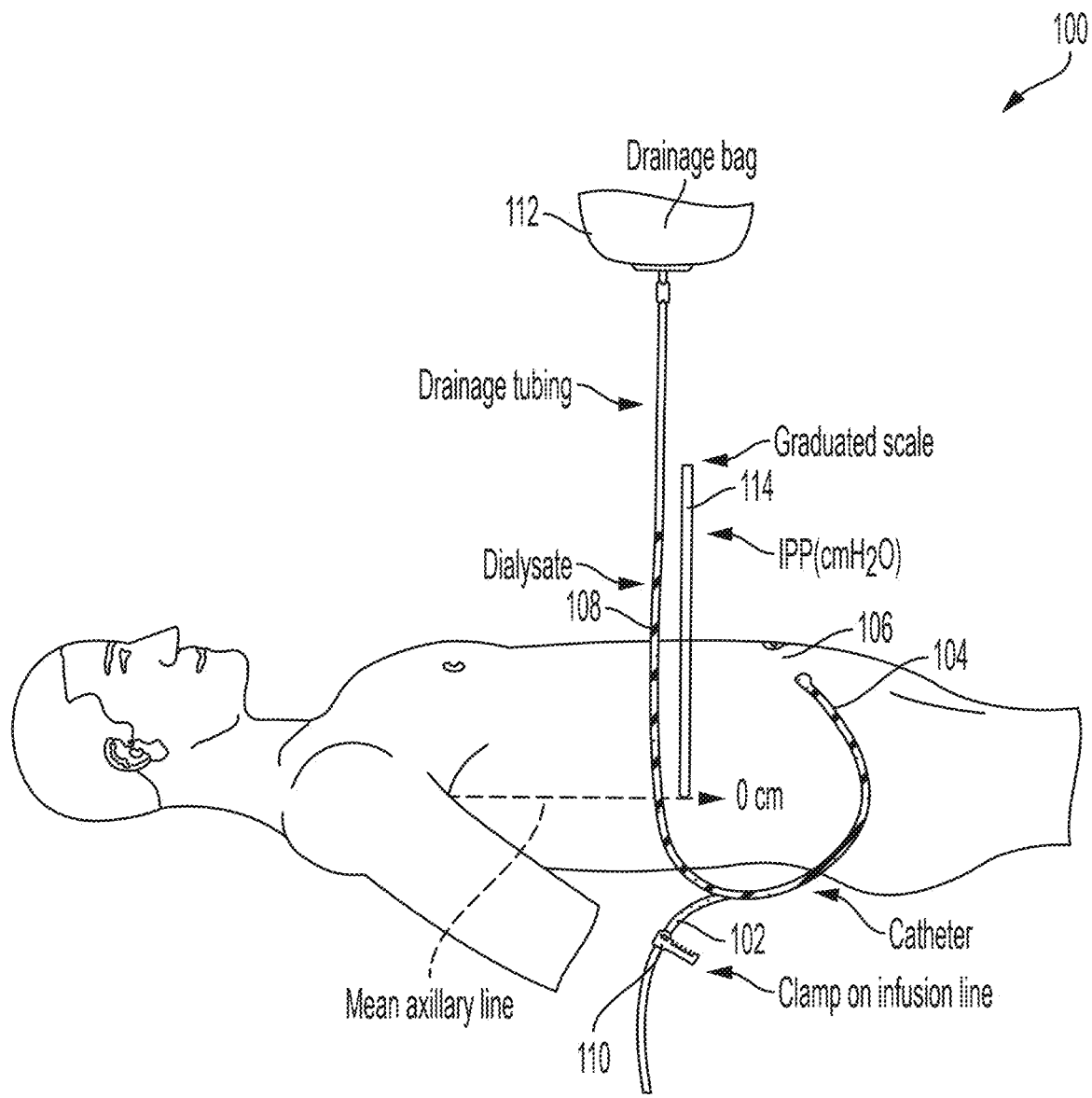
FIG. 1 shows a diagram of a known IPP measurement technique.

FIG. 1 shows a diagram of a known IPP measurement technique. A known IPP measurement system 100 includes a transfer set 102 fluidly connected to a catheter 104, which is inserted or fluidly connected to a peritoneal cavity 106 of a patient. Another end of the transfer set 102 (not shown) is connected to a source or container of fluid, such as PD fluid. The IPP measurement system 100 also includes a measurement or drainage line 108, which is fluidly connected to the catheter 104 and/or the transfer set 102.

An IPP measurement provides a measure of IPP in a patient's peritoneal cavity for a certain amount of infused PD fluid. For IPP measurements, a patient is usually in a supine or a horizontal position, as shown in FIG. 1. Also, the patient is relaxed and their head is supported to enable their abdominal wall to relax. This patient positioning avoids pressure on the abdomen. As shown in FIG. 1, a drainage bag 112 is held in a raised support for the drainage line 108. A graduated ruler or other distance measurement device 114 is placed next to the drainage line 108 going from the patient up to the bag 112 and aligning level 0 (i.e., 0 cm) with a mid-axillary line, as shown.

Figure 2:
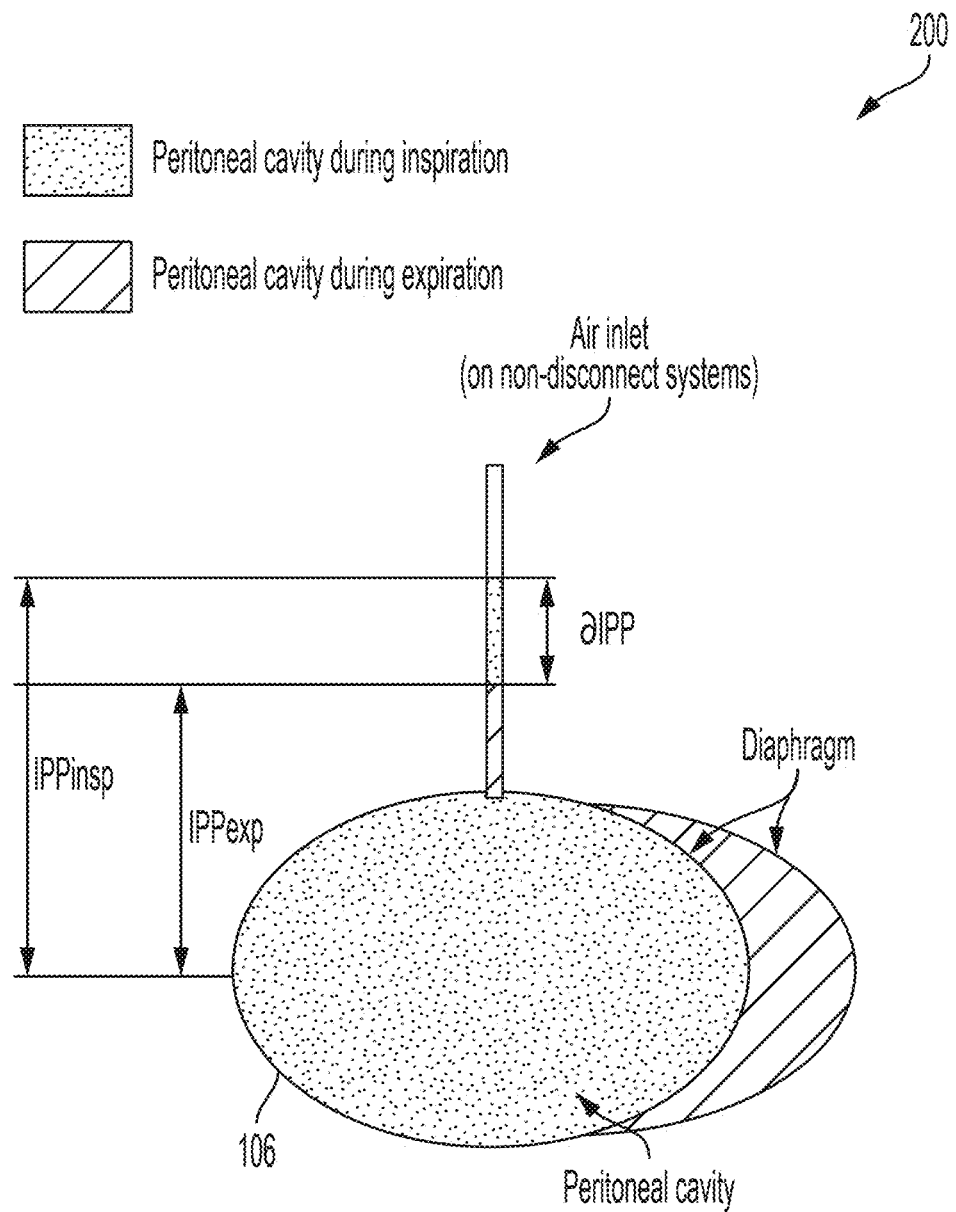
FIG. 2 is a diagram that shows how a volume of a peritoneal cavity changes during respiratory inspiration and expiration.

To perform a measurement, PD fluid is provided from the source through the transfer set 102 and the catheter 104 to the peritoneal cavity 106 of the patient. The peritoneal cavity 106 is filled to a certain percentage of cavity capacity. After a desired amount of PD fluid is provided to the peritoneal cavity 106, a clamp 110 is closed to prevent further fluid flow from the source. Next, a catheter connection is opened to enable at least some of the PD fluid from the patient's peritoneal cavity to flow into the drainage line 108. A column of the PD fluid rises in the drainage line 108 to a level where it stabilizes with a respiratory oscillation of 1 to 3 cm of $H_2O$, which provides an average measurement. FIG. 2 is a diagram that shows how a volume of a peritoneal cavity changes during respiratory inspiration and expiration. As shown in this figure, IPP during inspiration is greater because the peritoneal cavity contracts to become smaller. The IPP delta between inspiration and expiration is averaged to determine the IPP for the patient. In other words, the IPP is measured as the midpoint of that oscillation, and is expressed in centimeters ("cm") of $H_2O$. Once the measurement is obtained, the peritoneal cavity is drained and the volume is recorded in the drainage bag 112 as the fill volume. The process may be repeated for different amounts of PD fluid to determine a correlation between IPP measurements and fill volume for the particular patient.

In stable adult PD patients, an IPP of 10 to 16 cm of $H_2O$ on the mid-axillary line is considered acceptable for PD treatments, which generally corresponds to between 1.3 and 2.8 liters ("L") of infused PD fluid. The difference among patients between IPP and infused PD fluid volumes is due to variations in intraperitoneal volume ("IPV"), body position (with standing patients showing increases between 2 to 4 cm of $H_2O$ compared to laying down), physical activity, weight, height, and gender. Clinicians typically prefer to keep IPP below 18 to 20 cm of $H_2O$ since higher pressures are associated with symptoms, such as discomfort, fullness, sleep disturbances, hemodynamic issues, and respiratory alterations. Higher pressures may also contribute to certain mechanical complications (leakage, hernia, etc.).

IPP measurements may also be made while a patient is standing or sitting. In these instances, the point "0" is considered in the mid-axillary line at a midpoint between the xiphoid and pubic symphysis or in the antero-superior iliac spine of the patient. Despite a change in position, the IPP measurements are performed in the same manner as described-above for a patient laying down.

I. IPP MEASUREMENT EMBODIMENTS

Figure 3:
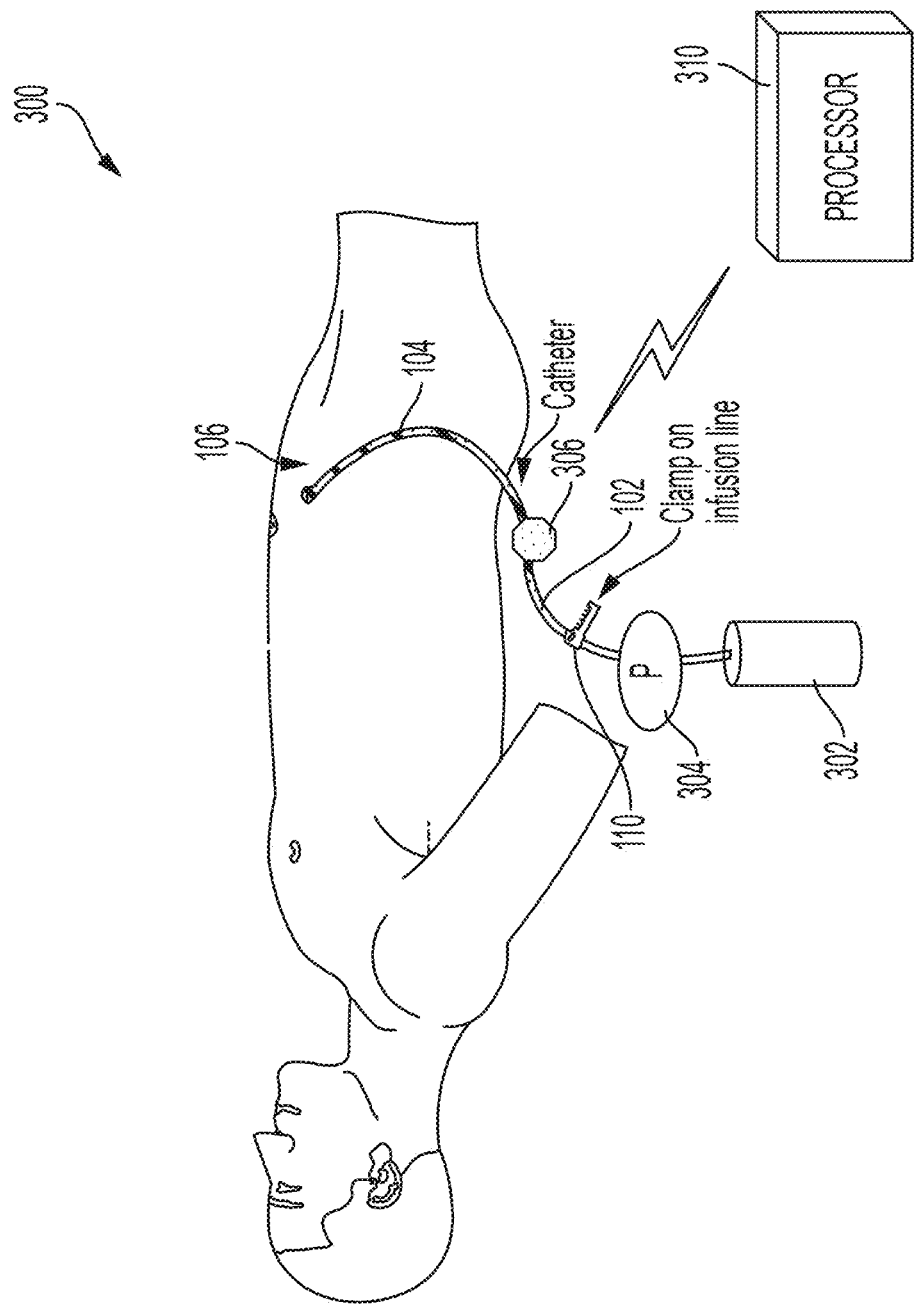
FIGS. 3 and 4 are diagrams of example IPP measurement systems, according to example embodiments of the present disclosure.
Figure 4:
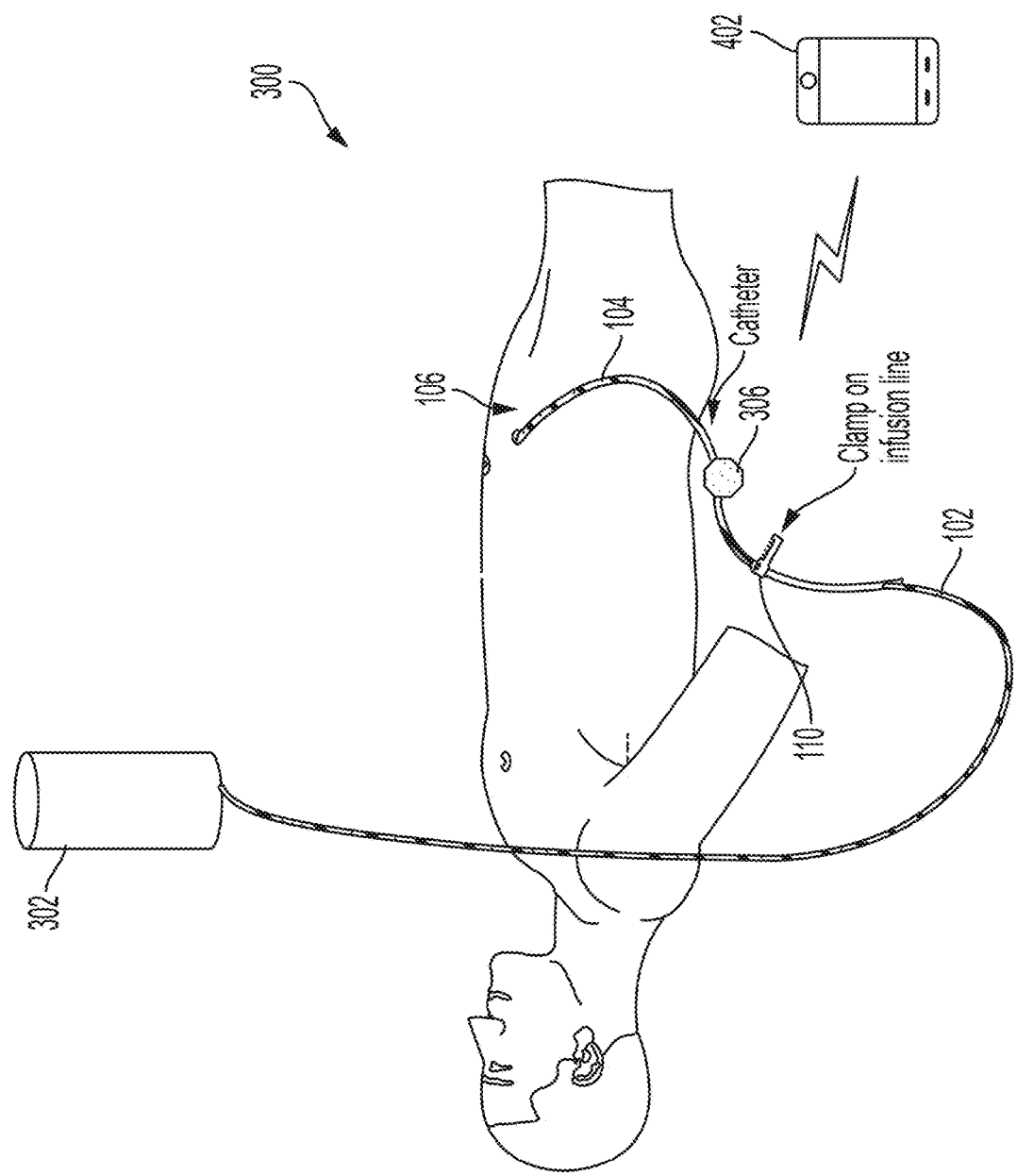

FIGS. 3 and 4 are diagrams of example IPP measurement systems 300, according to example embodiments of the present disclosure. The example system 300 includes a transfer set 102 that has a first end connected to a fluid container 302. The fluid container 302 may include any source of physiologically compatible fluid. The fluid container 302 is a PD fluid source and may include a bag or other enclosure configured to hold a volume of fluid, such as one to two liters of the fluid. In some embodiments, the fluid container 302 includes fresh, premade PD fluid having a certain, prescribed dextrose concentration. In some embodiments, the fluid container 302 may include two chambers, one with dialysis concentrate and another with purified water. In such embodiments, the container 302 includes a seal, which when broken, enables fluid in the two chambers to mix. The physiologically compatible fluid may include a PD fluid, saline, renal replacement fluid, etc.

A second end of the transfer set 102 is connected to a catheter 104, which is fluidly coupled to a peritoneal cavity 106 of a patient. The transfer set 102 and/or catheter 104 may be made of any one or more of polyvinyl chloride ("PVC"), polyethylene ("PE"), polyurethane ("PU"), polycarbonate or other non-PVC material.

In some embodiments, the system 300 of FIG. 3 may include a line clamp 110 to selectively restrict the flow of PD fluid through the transfer set 102. The illustrated embodiment may also include a pump 304. The example pump 304 may include a pump head that is fluidly connected to the transfer set 102. The pump 306 may be any type of fluid pump, such as a peristaltic pump, a gear pump, or a membrane pump. The pump head may be disposable and connected to a reusable actuator, which is controlled by an internal or external control unit. The example pump 304 is configured to pump fresh PD fluid from the container 302 to the patient's peritoneal cavity 106 to perform IPP measurements. The example pump 304 may also pump used PD fluid (including removed toxins and absorbed ultrafiltrate) from the patient's peritoneal cavity 106 back to the container 302 after IPP measurements have been recorded. In alternative embodiments, separate pumps are provided for (i) pumping fluid to a patient and (ii) pumping or pulling fluid from the patient. In some embodiments, the pump 304 is configured to occlude fluid flow from the fluid container 302 until the pump head is actuated, thereby preventing free flow of PD fluid and enabling the clamp 110 to be omitted.

The IPP measurement system 300 of FIG. 3 also includes a pressure sensor 306 for performing IPP measurements. The pressure sensor 306 in the illustrated embodiment is positioned to measure fluid pressure within the transfer set 102. In other embodiments, the pressure sensor 306 may be connected to or provided with the catheter 104. When PD fluid is provided to the peritoneal cavity 106 or removed from the peritoneal cavity 106, the pressure measurements are indicative of fluid pressure delivered to or removed from the peritoneal cavity 106. When pumping stops and the PD fluid is permitted to dwell in the peritoneal cavity for a specified duration, the pressure measurements provided by the pressure sensor 306 are indicative of IPP. The pressure measurements may also be used for detecting a line occlusion (based on an upward positive or negative pressure spike/trend) or a fluid leak (based on downward positive or negative pressure spike/trend).

In the illustrated example, the pressure sensor 306 is shown as being in-line with the transfer set 102. It should be appreciated that the pressure sensor 306 may be in-line or otherwise integrated with the catheter 104. It should also be appreciated that the pressure sensor 306 may include disposable tube sections that contact the transfer set 102 and the PD fluid, while the reminder of the sensor 306 is reusable between IPP measurements. Alternatively, the entire pressure sensor 306 may be disposable.

In some embodiments, the system 300 may also include a flow sensor (not shown) having an output that is integrated to measure a volume of PD fluid provided to the patient and/or removed from the patient. It should be appreciated that one or more pressure sensors 306 may additionally or alternatively be used to measure a flow or flow rate of the fluid delivered to or removed from the peritoneal cavity 106. Further, the system 300 may include a heater for warming the PD fluid prior to infusion into the patient. The system 300 may further include a temperature sensor to ensure the PD fluid is heated to a desired temperature.

Although not illustrated, an airtrap may be provided in the transfer set 102 to remove air from the PD fluid prior to patient delivery. In other instances, priming of the transfer set 102 may remove air without the need for an airtrap. Heating dialysis fluid tends to separate dissolved air from the dialysis fluid. It is accordingly contemplated to locate the airtrap downstream from a heater, e.g., along the transfer set 102 and upstream of a temperature sensor.

The example system 300 also includes a processor 310 for communicating with the pressure sensor 306. The processor 310 may include any computer, laptop, workstation, server, etc. In some embodiments, the processor 310 is communicatively coupled to the pressure sensor 306 via a wired interface, such as a universal serial bus ("USB") connection, or a wireless interface, such as a Bluetooth®, Zigbee®, or Near-Field Communication ("NFC") connection. Further, the processor 310 may also be communicatively coupled to the pump 304.

As described herein, the example processor 310 executes machine readable instructions stored in a memory device. The instructions may comprise an application or software program. Execution of the instructions causes the processor 310 to perform the operations described herein. For instance, the processor 310 receives IPP measurement output data, which is transmitted from the pressure sensor 306. The processor 310 may ensure the received IPP output data conforms to a specified range. Further, the processor 310 may make adjustments to the output data based on patient information and/or force sensor information.

The operations performed by the processor 310 provide for the determination of a fill volume parameter for PD treatments. In some embodiments, the processor 310 uses the received data to calculate or otherwise determine a fill volume parameter for a patient under measurement. Additionally or alternatively, the processor 310 may cause a display device to display IPP measurements and/or adjustment information to enable a clinician to determine a fill volume parameter for a patient's PD treatment.

FIG. 4 is a diagram of another embodiment of the IPP measurement system 300. In the illustrated example of FIG. 4, the pump 304 is replaced by positioning the fluid container 302 at or above a head-height of a patient (e.g., three to six feet above ground level). This enables gravity to pull PD fluid from the fluid container 302 through the transfer set 102 to the peritoneal cavity 106 of the patient. In the illustrated example, the clamp 110 provides for selective flow of the PD fluid.

Additionally, FIG. 4 shows that a portable device 402 is communicatively coupled to the pressure sensor 306. The connection may be via a wired interface, such as a USB connection, or a wireless interface, such as Bluetooth®, Zigbee®, NFC, etc. The portable device 402 may include a smartphone, a tablet computer, a laptop computer, etc. In some instances, the portable device 402 is communicatively coupled to a server or the processor 310 of FIG. 3 via the Internet or a local area connection, such as Wi-Fi. The portable device 402 is configured to receive IPP output data from the pressure sensor 306 for determining a fill volume parameter for a patient. Similar to the processor 310 of FIG. 3, the portable device 402 enables adjustments to be made to the IPP measurement and/or fill volume parameter based on force sensor output data and/or patient information.

Figure 5:
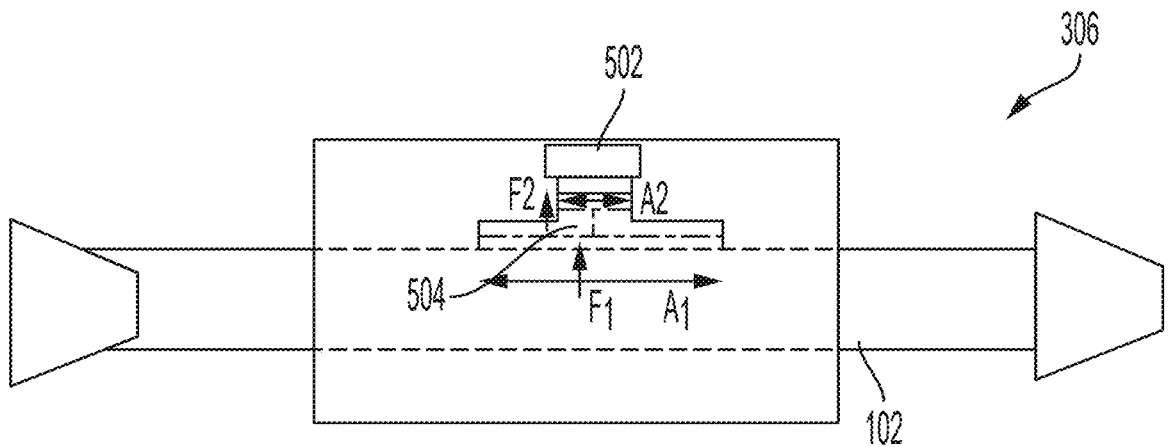
FIGS. 5 to 7 are diagrams of the pressure sensor of FIGS. 3 and 4, according to example embodiments of the present disclosure.
Figure 6:
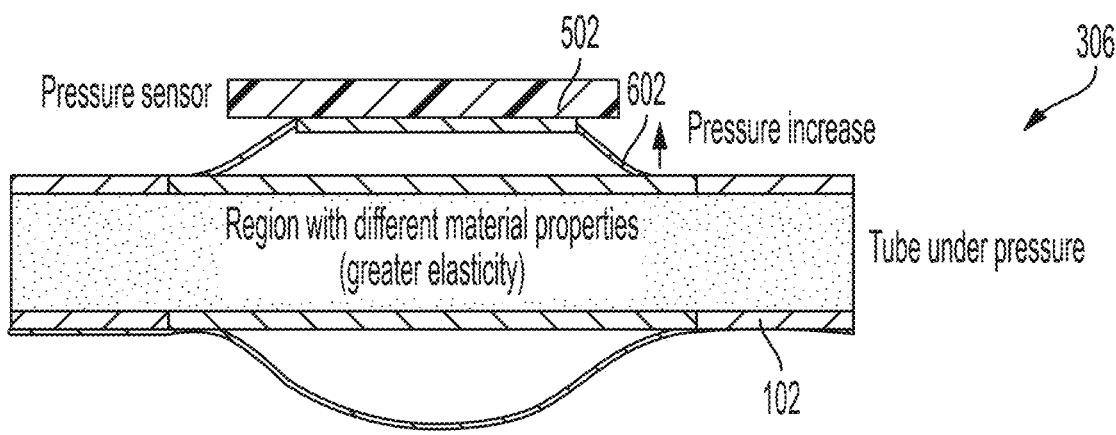
Figure 7:
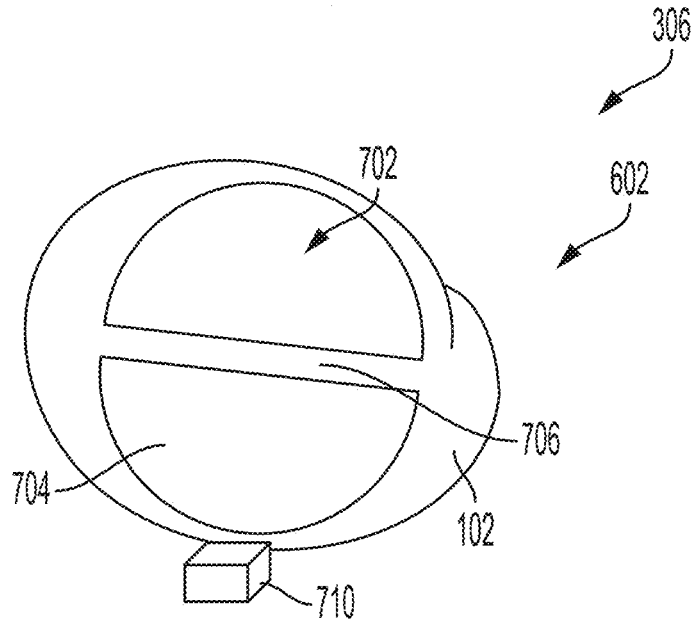

FIGS. 5 to 7 are diagrams of the pressure sensor 306 of FIGS. 3 and 4, according to example embodiments of the present disclosure. In the illustrated embodiments, the pressure sensor includes an amplifier. Typical IPP values are between 15 to 20 centimeters ("cm") of $H_2O$ (0.213 to 0.284 pounds per square inch ("psig")). However, many commercial pressure sensors for medical applications have pressure ranges from 0.0 to 5.0 psig. As a result, the use of a commercial pressure sensor for measuring IPP may only use a small portion of range on a low side of detectable pressures. Many known pressure sensors are less accurate below 0.8 psig, and may not adequately have measurement precision for pressure ranges between 0.2 and 0.3 psig. The disclosed amplifier increases the measurement range, thereby enabling the pressure sensor 306 to provide a more accurate differentiation between IPP measurements.

FIG. 5 shows a pressure sensor 306, which is adapted to contact the transfer set 102. In other instances, the pressure sensor 306 may be connected to or integrated with the catheter 104. The pressure sensor 306 includes a pressure element 502 that transduces a measured pressure into a digital and/or analog signal. The pressure element 502 includes at least one of a piezoresistive strange gauge, a pressure sensing diaphragm, a pressure pod, a capacitive diaphragm, a pressure sensing capsule, or a bourdon tube.

The pressure sensor 306 also includes an amplifier 504. The amplifier 504 includes a first side that contacts a portion of the transfer set 102. A second, opposite side of the amplifier 504 contacts the pressure element 502. The first side of the amplifier 504 has a greater diameter or surface area compared to the second side that contacts the pressure element 502. The difference in force is illustrated in FIG. 5 by pistons, where a first piston has a surface area that is greater than a second piston. Force applied from the transfer set 502 to the first area causes the first piston to apply force against the second piston. The force from the first piston is condensed against the smaller surface area of the second piston. This condensation of force causes the applied force value to increase, which is sensed by the pressure element 502.

The pressure amplifier 504 uses Pascal's Law in one embodiment to amplify fluid pressure in the transfer set 102. The pressure amplification enables medical grade pressure sensors to be used in this low IPP measurement application. According to Pascal's law, force or pressure is proportional to a surface area upon which the force is applied. In an example, a force having a value of one psig applied to a first surface area of two $cm^2$ causes a pneumatically and/or mechanically coupled second surface having a surface area of one $cm^2$ to impart a force of approximately two psig. In the illustrated example, the first side of the amplifier 504 has an area ($A_1$) that is at least twice the area of the second side ($A_2$), thereby providing an amplification factor of at least two. In other embodiments, the areas of the first side and second side may be selected to provide an amplification factor of three, four, five, ten, twenty, etc.

In the illustrated example, the processor 310 and/or the portable device 402 is configured to normalize the IPP measurements to account for the amplification. For example, if the amplification is provided by the amplifier 504, the processor 310 and/or the portable device 402 may reduce the IPP measurement by the amplification factor. In other embodiments, the fill volume parameter may be correlated with the amplified IPP measurement values.

FIG. 6 shows an alternative embodiment of the pressure sensor 306. In the illustrated embodiment, a section 602 of the transfer set 102 includes material having a greater elasticity compared to other sections. The greater elasticity enables the section 602 to amplify pressure imparted on the pressure element 502 as pressure increases within the transfer set 102. Similar to the example discussed in connection with FIG. 5, the example of FIG. 6 provides an increased IPP measurement range, thereby improving IPP measurement detection accuracy. In some embodiments, the elastic expansion of a material of the section 602 is linear. If the material of the section 602 exhibits non-linear expansion, the processor 310 and/or the portable device 402 is configured to account for the non-linearity of the material. This accounting may include providing a non-linear calibration curve for the section 602 that corresponds to linear pressure changes within the transfer set 102.

FIG. 7 shows a further embodiment of the pressure sensor 306. In this example, at least a portion of the transfer set 102 includes a duel lumen with a fluid path side 702 and a non-fluid path side 704. The dual lumen may extend through the transfer set 102 or be located at a section adjacent to a sensor element. The non-fluid path side 704 may be filled with air or fluid of a known volume and/or pressure, thereby providing a reference pressure. A diaphragm 706 separates the sides 702 and 704 of the transfer set 102. The diaphragm 706 moves towards the fluid path side 702 when the reference side 704 has a greater pressure, and vice versa. A sensor element 710 may be positioned adjacent to the reference side 704. As the diaphragm 706 moves, a volume within the side 704 changes, thereby changing the internal pressure. The sensor element 710 senses this internal pressure, which is transmitted to the processor 310 and/or the portable device 402 as the IPP measurement.

II. FORCE SENSING EMBODIMENTS

Figure 8:
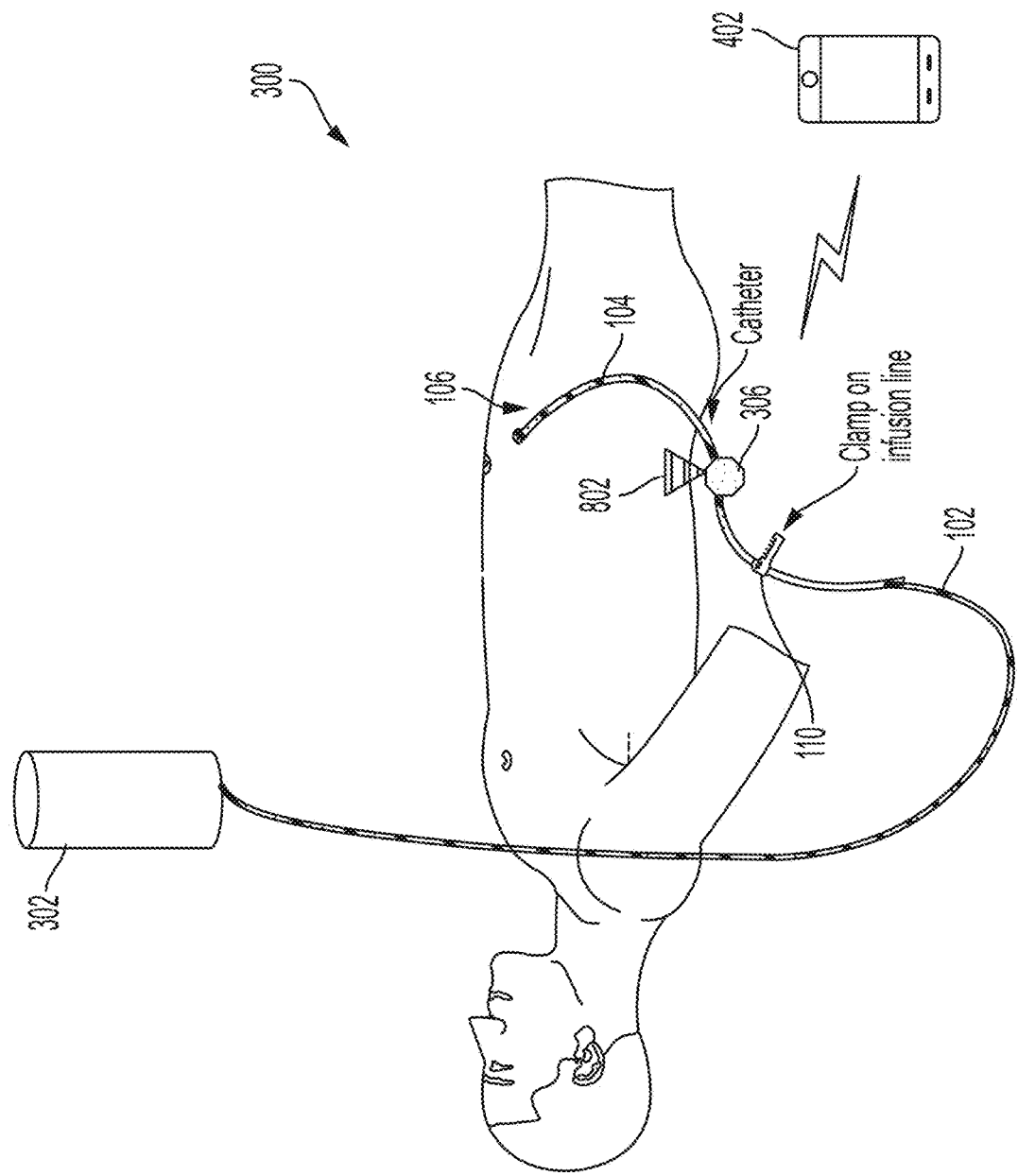
FIG. 8 is a diagram that shows a force sensor connected to or otherwise integrated with the pressure sensor of FIGS. 3 to 7, according to an example embodiment of the present disclosure.

FIG. 8 is a diagram that shows a force sensor 802 connected to or otherwise integrated with the pressure sensor 306 of FIGS. 3 to 7, according to an example embodiment of the present disclosure. In some instances, the IPP measurement performed by the pressure sensor 306 may be inaccurate due to a change in orientation of a patient or the sensor itself. The change in orientation or position causes increases or decreases in the IPP pressure reading due to changes in head height and/or stress placed on the peritoneal cavity.

To reduce IPP measurement error, the example force sensor 802 provides force output data that is indicative of pressure sensor 306 and/or patient movement. The force output data is received by the processor 310 and/or portable device 402 to adjust an IPP measurement and/or a fill volume parameter. In some instances, force values above a certain threshold may cause the IPP measurement to be disregarded by the processor 310 and/or the portable device 402. For instance, detection of a significant change in patient position may cause IPP measurements recorded during that movement to be removed from the processor 310 and/or the portable device 402 since the movement likely contributed significant error to the measurement.

The force sensor 802 may include an inertial sensor, gyroscope, and/or accelerometer. Sensing may be provided in at least one axis including an x, y, z, yaw, pitch, and/or roll axis. In some embodiments, the force sensor 802 and/or the pressure sensor 306 are placed on or in-line with the patient's mid-line (if supine) or pelvic cup (if sitting/standing). The force sensor 802 detects relative changes in orientation/angle of the pressure sensor 306 and/or the patient from the initial placement position.

The force sensor 802 transmits force output data to the processor 310 and/or the portable device 402. In some instances, the force sensor 802 may use the same transceiver or transmitter as the pressure sensor 306. In other instances, the force sensor 802 may have its own transceiver or transmitter. The processor 310 and/or the portable device 402 uses the force output data to determine if the IPP measurement is to be processed, and if so, provides an adjustment to the IPP measurement and/or a fill volume parameter.

Figure 9:
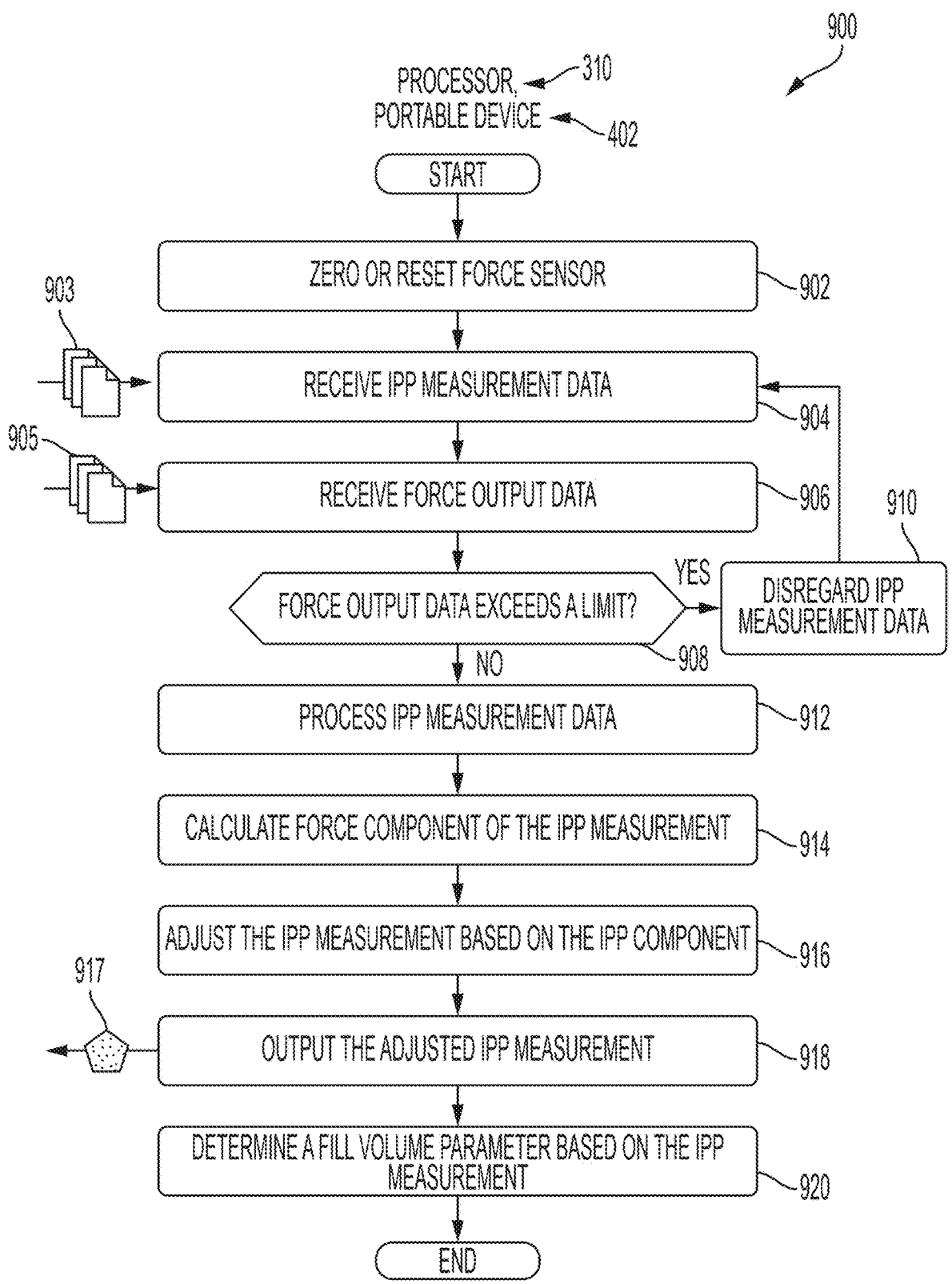
FIG. 9 is a flow diagram of an example procedure for using force output data in conjunction with IPP measurements to determine a fill volume parameter, according to an example embodiment of the present disclosure.

FIG. 9 is a flow diagram of an example procedure 900 for using force output data in conjunction with IPP measurements to determine a fill volume parameter of a patient, according to an example embodiment of the present disclosure. Although the procedure 900 is described with reference to the flow diagram illustrated in FIG. 9, it should be appreciated that many other methods of performing the steps associated with the procedure 900 may be used. For example, the order of many of the blocks may be changed, certain blocks may be combined with other blocks, and many of the blocks described may be optional. In an embodiment, the number of blocks may be changed. For example, the force output data may be used to correct a fill volume parameter rather than the IPP measurement. The actions described in the procedure 900 are specified by one or more instruction and may be performed among multiple devices including, for example, the force sensor 802, the pressure sensor 306, the processor 310, and/or the portable device 402.

The example procedure 900 begins when a patient is connected to the transfer set 102 and the catheter 104. After the transfer set 102 is in place, the force sensor 802 is zeroed or reset while being placed at the patient's mid-line or low pelvis (block 902). Such resetting provides a zero-point of the inertial sensors and/or accelerometers. In some instances, a clinician may manually zero the force sensor 802 by pressing a reset button on the sensor. Alternatively, the clinician may enter an input into the processor 310 and/or the portable device 402, which transmits an instruction to the force sensor 802 causing it to zero or reset.

The clinician than begins filling the patient's peritoneal cavity. After a certain percentage of the cavity is filled, the flow of PD fluid is stopped and the pressure sensor 306 transmits IPP measurement data 903 that is indicative of an IPP within the peritoneal cavity (block 904). The processor 310 and/or the portable device 402 receives force output data 905 from the force sensor 802 (block 906). The processor 310 and/or the portable device 402 compares the force output data 905 to one or more force limits (block 908). If the force output data 905 exceeds the one or more force limit, the processor 310 and/or the portable device 402 disregards the corresponding IPP measurement data 903 (block 910). The force output data exceeding the one or more limit may be indicative of a patient changing position, exerting more substantive movement, or dropping the pressure sensor 306 or transfer line 102. In these instances, IPP measurement data will not be accurate or representative of the actual IPP pressure.

Figure 10:
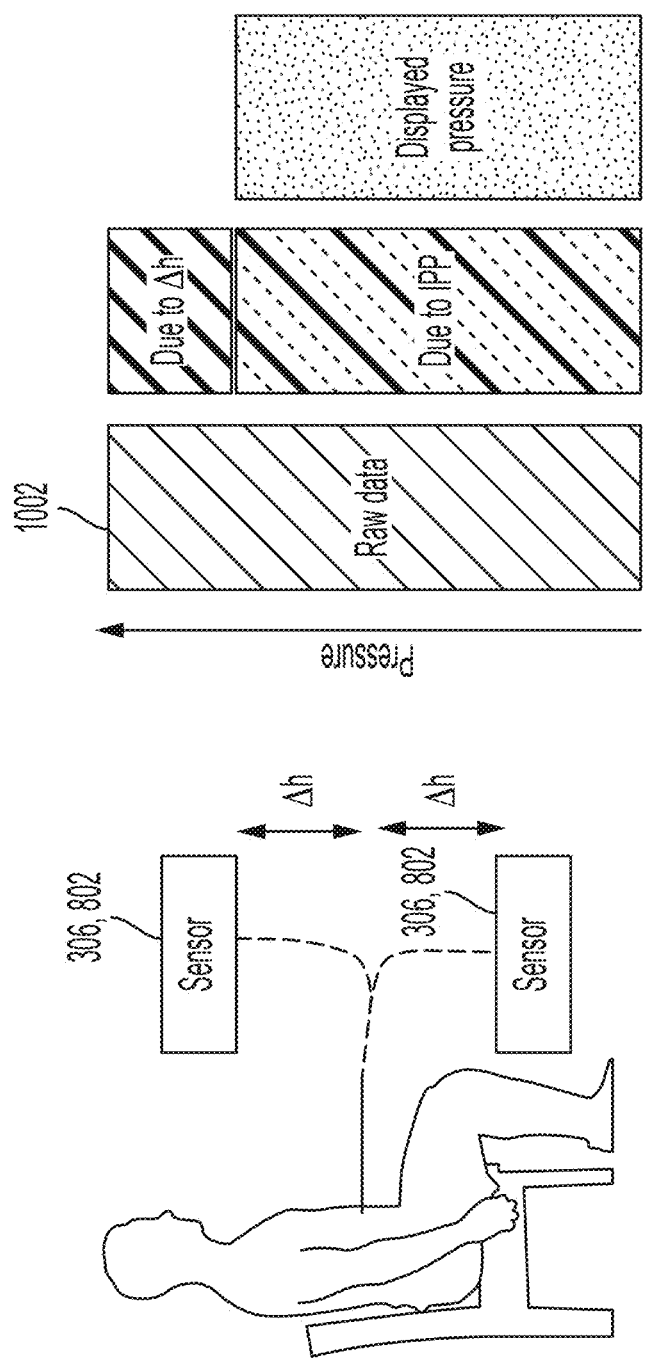
FIG. 10 is a diagram that is illustrative as to how a processor and/or a portable device calculates an IPP component related to patient and/or sensor movement, according to an example embodiment of the present disclosure.

When the force output data is within the one or more limits, the processor 310 and/or the portable device 402 proceeds to process the IPP measurement data 903 (block 912). This includes determining an IPP measurement component that is due to measured forces (block 914). FIG. 10 is a diagram that is illustrative as to how the processor 310 and/or the portable device 402 calculates an IPP component related to patient and/or sensor movement, according to an example embodiment of the present disclosure. In the illustrated example, the sensor 306, 802 may be moved to a different or more convenient location for the clinician or the patient, such as either higher or lower. This may be due to the patient having a higher exit site for their catheter, or to enable the sensor 306, 802 to be in the most comfortable or convenient location for the clinician/patient. The processor 310 and/or the portable device 402 calculates a change in position of the sensor 306, 802 using raw force output data 1002. The change in position provides, for example, a head height change, which is correlated to a change in pressure within the transfer set 102 based on a degree of the change. Changes to lateral position and/or rotation also correspond to changes in pressure. The pressure changes are summed as the IPP component related to movement of the sensor 306, 802 and/or patient (i.e., Δh). As shown in FIG. 10, the processor 310 and/or the portable device 402 adjusts the IPP measurement based on the IPP component related to the force output data. This may include an update adjustment or subtraction based on the IPP component (block 916 of FIG. 9).

Returning to FIG. 9, the processor 310 and/or the portable device 402 then outputs or otherwise causes the adjusted IPP measurement 917 to be displayed (block 918). In some instances, the steps of blocks 902 to 918 are repeated at least once to obtain a sample set of IPP measurements over one or more respiratory cycles to enable the IPP measurement to be averaged. In some embodiments, the processor 310 and/or the portable device 402 causes a graph to be displayed that shows IPP measurements over time, thereby enabling an average to be computed or otherwise determined. The processor 310 and/or the portable device 402 next determines a fill volume parameter based in the adjusted IPP measurement (block 920). The fill volume may be determined by correlating the IPP measurement to a fill volume for patients with similar body masses/heights as the patient under measurement. In other instances, the volume of PD fluid infused into the patient may be measured using either a flow sensor or draining and measuring the PD fluid.

In some embodiments, additional PD fluid may be added to the patient if the IPP measurement falls below a threshold for performing an adequate PD fill. The steps of 902 to 918 may be repeated until the adjusted IPP measurement is between 16 to 19 cm of $H_2O$ or between 0.25 to 0.28 psig, which is indicative of an adequate fill volume for a PD treatment. The fill volume parameter is then determined from the patient characteristics and/or detected amount of PD fluid infused into the patient's peritoneal cavity. The fill volume parameter may then be used for subsequent PD treatments, using a PD machine or manually for a continuous ambulatory peritoneal dialysis ("CAPD") treatment. The example procedure 900 then ends.

In some embodiments, the patient may wear a force sensor. For example, the force sensor may be connected to a wrist or abdomen of the patient. Output data from the sensor provides further data indicative of patient movement. The force sensor worn by the patient may be used with the force sensor 802 provided with the pressure sensor 306. Alternatively, only a force sensor connected to a patient is provided. In some instances, data from the force sensor connected to the patient is tracked over time in conjunction with IPP measurements. For example, a patient may go through a daily routine or a set of activities with the transfer set 102 connected. The IPP measurements may be correlated with force data (to enable force-related components to be removed) to identify how IPP changes for a patient for different orientations and/or activities. A clinician may use this correlation to ensure a fill volume does not cause a patient's IPP to exceed clinically recommended limits regardless of which position or activity is conducted by the patient, thereby improving patient comfort during treatment. The fill volume determined by the clinician may then be set in the patient's treatment or device prescription and downloaded locally or remotely to the patient's cycler or peritoneal dialysis machine.

III. IPP MEASUREMENT VALIDATION EMBODIMENT

In some embodiments, the processor 310 and/or the portable device 402 is configured to validate IPP measurement data prior to processing the data. For example, as shown in block 908 of FIG. 9, the processor 310 and/or the portable device 402 compares received IPP measurement data to one or more ranges or thresholds that are indicative of substantial patient and/or sensor movement. This operation may also include a comparison to one or more range and/or limit that corresponds to normal fill pressures and/or expected IPP measurement values. IPP measurements that are outside of the ranges and/or limits may be indicative of an issue with a catheter connection, catheter blockage, leakage in a transfer set, or other fluid connectivity issues.

Figure 11:
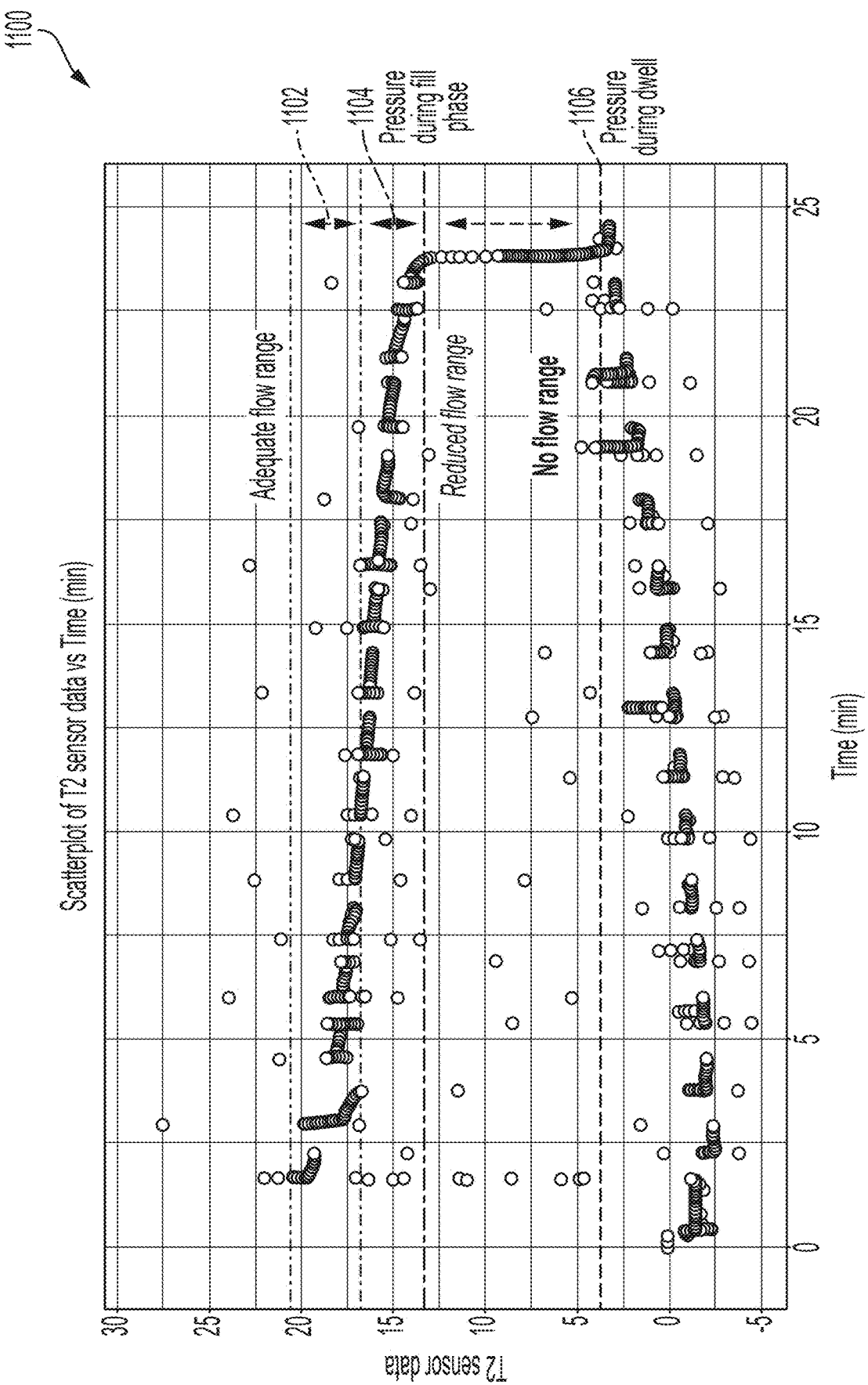
FIGS. 11 and 12 are diagrams of graphs that are illustrative of a comparison of IPP measurements to one or more ranges and/or thresholds, according to an example embodiment of the present disclosure.

FIG. 11 shows a graph 1100 that is illustrative of a comparison of IPP measurements to one or more ranges and/or thresholds, according to an example embodiment of the present disclosure. The graph 1100 includes a first range 1102 that corresponds to acceptable pressure measurement values when PD fluid is being infused into the peritoneal cavity of a patient. During a PD fluid fill, force is applied to the sensor element (e.g., transducer membrane) as a result of the fluid flow. The first range 1102 may correlate to fluid fills for gravity fed administration, while a second range may be used if a pump provides the PD fluid.

The graph 1100 also includes a second range 1104 that corresponds to reduced pressure as a result of a transfer set or catheter partial occlusion. During a fill phase, the processor 310 and/or the portable device 402 receives IPP measurement data and compares the data to the first range 1102 and the second range 1104. If the IPP measurement data corresponds to the second range 1104, the processor 310 and/or the portable device 402 may generate an alert or other message/indication that there is an issue with the catheter and/or transfer set. Further, the processor 310 and/or the portable device 402 may prevent subsequent IPP measurements from being processed until it is confirmed that a patient has been properly filled with PD fluid.

The graph 1100 shows that over time, pressure measurement data decreases. This decrease is a result of a lower flowrate as a gravity-fed PD fluid bag empties into a patient. In some instances, the ranges 1102 and 1104 may have corresponding decreases over time to account for expected pressure declines during PD fluid infusion. The pressure values on the y-axis are normalized for brevity.

The graph 1100 also includes a third range 1106, which is applied after the flow of PD fluid has been stopped and the fluid is permitted to dwell in a patient's peritoneal cavity. The processor 310 and/or the portable device 402 may use the third range 1106 to identify IPP measurements that exceed allowable pressure thresholds, which may be indicative of patient movement, transfer set movement, or overfilling of a patient. IPP measurements over this third range 1106 may be disregarded by the processor 310 and/or the portable device 402. Additionally or alternatively, the processor 310 and/or the portable device 402 may generate an alarm. It should be noted that IPP measurements increase over time because the PD fluid absorbs waste and other toxins from the patient, which increases the volume of fluid in the peritoneal cavity, thereby increasing the measured pressure. The processor 310 and/or the portable device 402 may be configured to log the IPP measurement over time to ensure a PD fill volume does not exceed allowable IPPs during a dwell phase, which may cause patient discomfort during a PD treatment.

Figure 12:
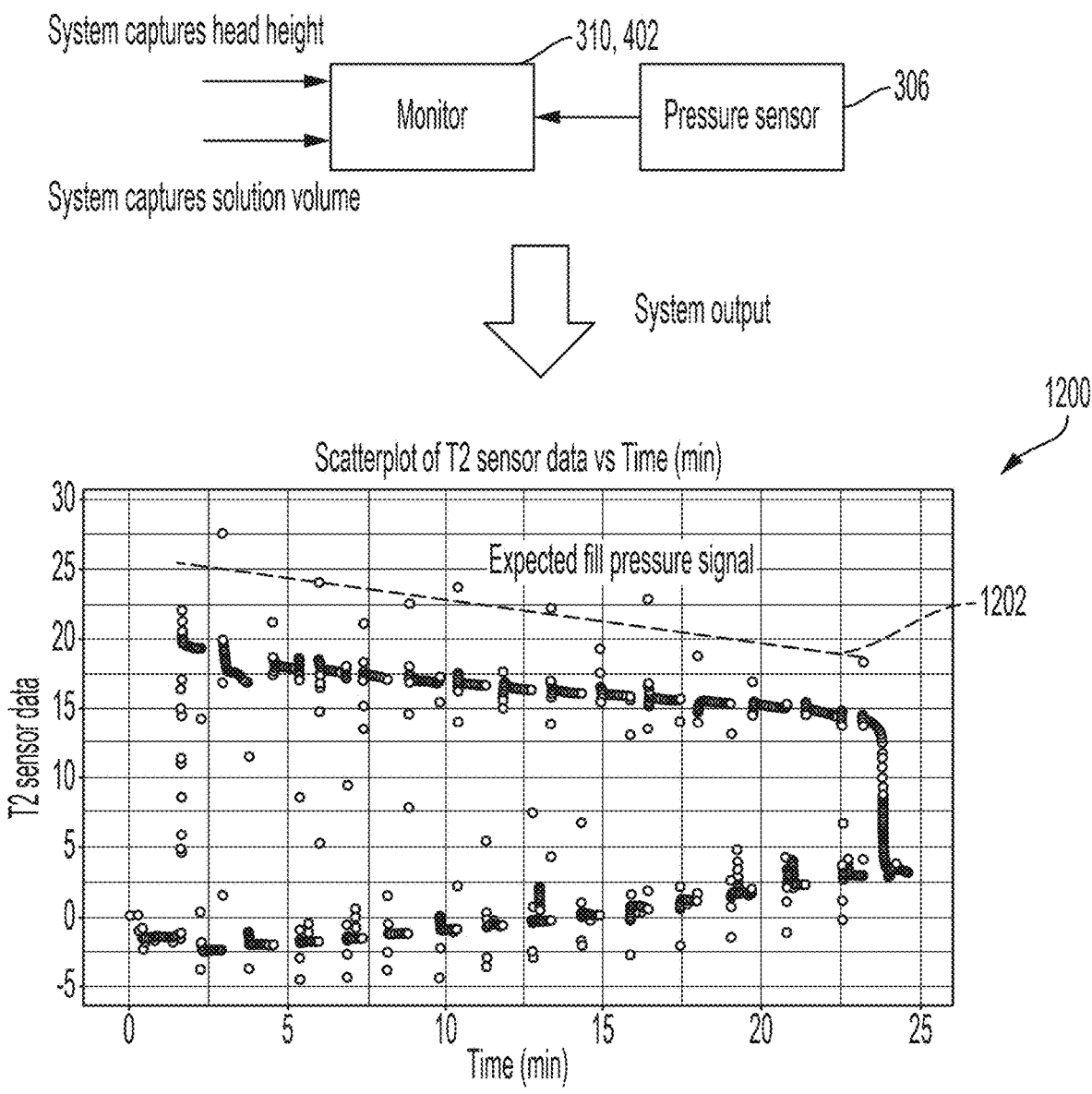

FIG. 12 shows a graph 1200 of an alternative embodiment in which the processor 310 and/or the portable device 402 uses a recorded bag fill head height value and bag solution volume to determine a threshold 1202, which corresponds to an expected fill pressure. When a pump is provided, an expected pump pressure value may be used instead. In this example, the processor 310 and/or the portable device 402 estimates the threshold based on actual fill conditions to more accurately determine if there is an issue infusing a PD fluid into a patient's peritoneal cavity. The graphs 1100 and 1200 may be displayed by the processor 310 and/or the portable device 402 to a clinician.

IV. IPP MEASUREMENT ADJUSTMENT USING PATIENT INFORMATION EMBODIMENT

During an IPP measurement, the processor 310 and/or the portable device 402 may adjust an IPP measurement or a fill volume parameter based on received patient information. In some situations, a patient's water retention may affect peritoneal cavity volume or pressure provided on the cavity, which affects IPP measurements. Additionally, a patient's blood pressure or heart rate may be indicative as to whether the patient is under stress or exertion, which can affect IPP measurements.

Figure 13:
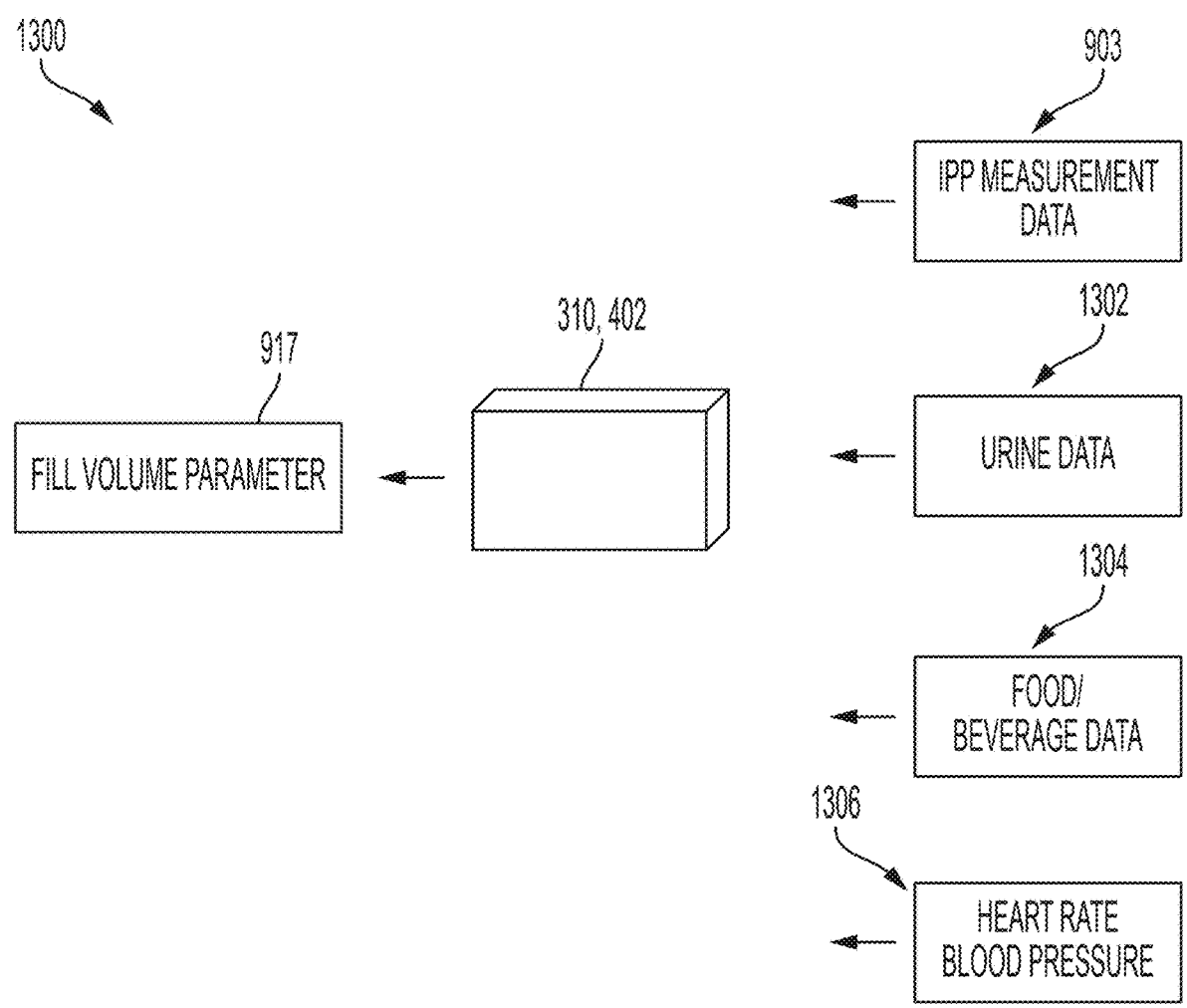
FIG. 13 is a diagram that illustrates data processing by a processor and/or a portable device to adjust IPP measurements based on patient information, according to an example embodiment of the present disclosure.

FIG. 13 is a diagram 1300 that illustrates data processing by the processor 310 and/or the portable device 402 to adjust IPP measurements based on patient information, according to an example embodiment of the present disclosure. As shown, the processor 310 and/or the portable device 402 receives IPP measurement data 903. The processor 310 and/or the portable device 402 may also receive urine data 1302, which indicates a patient's urine output in a specified time before the IPP measurement, such as twenty-four or forty-eight hours. The urine output may be self-reported by the patient and entered into the processor 310 and/or the portable device 402. In other instances, the urine output may be measured in a container and entered into the processor 310 and/or the portable device 402.

The processor 310 and/or the portable device 402 also receives food and beverage consumption information 1304. This information provides an indication as to how much food and beverage was consumed by a patient in a time period leading up to the IPP measurement or between IP measurements. Together, the urine data 1302 and the food/beverage data 1304 provides fluid balance information. The processor 310 and/or the portable device 402 is configured to calculate a patient's fluid balance by summing the food/beverage data 1304 and subtracting the urine data 1302, and accounting for metabolic burn of fluids based on patient populations of similar age, gender, height, and weight. The processor 310 and/or the portable device 402 then determines if the patient's fluid balance imparts an IPP measurement component by comparing the calculated balance information to a correlation of balance information and IPP measurements for patients with similar heights, genders, weights, etc. The processor 310 and/or the portable device 402 then adjusts the IPP measurement data 903 by accounting for the IPP component related to fluid balance. In instances where the fluid balance is negative, such as instances of dehydration, the adjustment may result in an increase in the value of the IPP measurement.

The processor 310 and/or the portable device 402 also receives heart rate and blood pressure data 1306. The processor 310 and/or the portable device 402 correlates the data 1306 to an IPP measurement component based on a population of patients with similar heights, weights, genders, ages, etc. The processor 310 and/or the portable device 402 then adjusts the IPP measurement by the identified IPP measurement component.

After adjusting the IPP measurement, the processor 310 and/or the portable device 402 determines the fill volume parameter 917. As discussed above, this may include comparing the adjusted IPP measurement (or a trend of adjusted IPP measurements) to fill IPP limits for PD therapy. Once the IPP measurements are close, but do not exceed a limit, the processor 310 and/or the portable device 402 determines a fill volume as a volume of PD fluid within the patient's peritoneal cavity using either a body mass of the patient or determining the PD fluid volume by draining the fluid and/or using a flow sensor. The fill volume parameter 917 may then be used for subsequent PD treatments.

V. LUNG CAPACITY FOR DETERMINING FILL VOLUME EMBODIMENT

In the examples discussed above, IPP measurements have been made using the pressure sensor 306. In some embodiments, the pressure sensor 306 may be replaced with a lung capacity sensor, such as a spirometer. Lung capacity has been shown to decrease as IPP increases. The processor 310 and/or the portable device 402 may use known correlations between lung capacity and IPP measurements to determine a fill volume parameter for a patient without the use of a pressure sensor.

Figure 14:
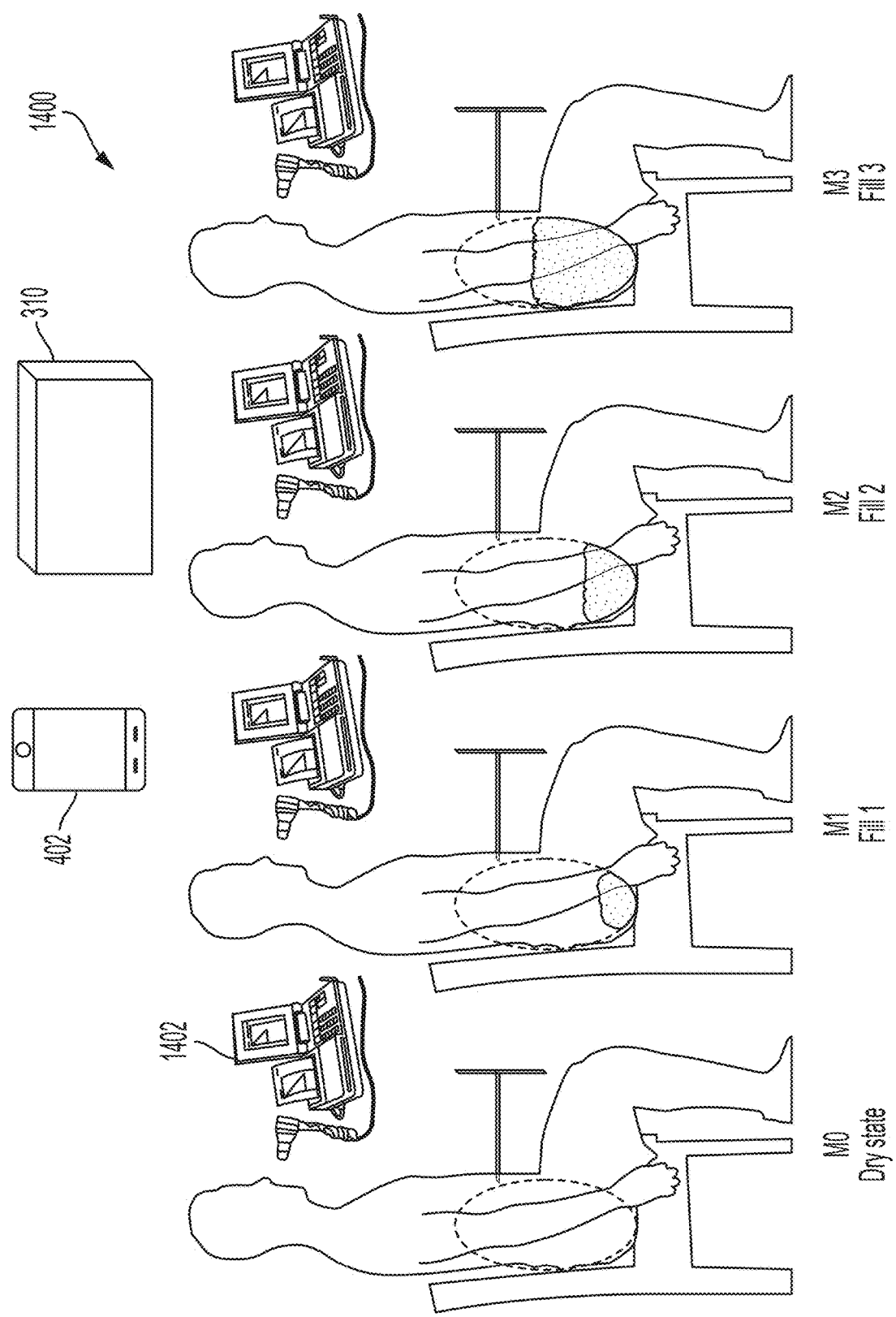
FIG. 14 is a diagram of an example system in which a spirometer is used to conduct lung capacity measurements to determine a fill volume parameter for a PD treatment, according to an example embodiment of the present disclosure.

FIG. 14 shows an example system 1400 in which a spirometer 1402 is used to conduct lung capacity measurements to determine a fill volume parameter, according to an example embodiment of the present disclosure. Such lung capacity measurements enable greater efficiency for IPP measurements that may otherwise result in the errors discussed above. Further, the use of the spirometer 1402 enables a standard transfer set and catheter to be used as opposed to a transfer set or catheter equipped with a pressure sensor.

As shown in FIG. 14, the spirometer 1402 measures patient respiratory capacity at different fill levels, shown as M0 (dry state), M1 (10% of fill capacity), M2 (20% of fill capacity), M3 (50% of fill capacity), etc. After the patient is filled to an estimated desired percentage of cavity capacity, the spirometer 1402 records the patient's lung capacity. The spirometer 1402 may record lung capacity over one or more respiratory cycle to determine an average lung capacity.

The example processor 310 and/or the portable device 402 receives the lung capacity data from the spirometer 1402. The processor 310 and/or the portable device 402 use known correlations between lung capacity and IPP to adjust an IPP measurement to provide a more accurate measurement. The identified IPP value may then be used for determining fill volume and/or identifying when the PD fluid fill has reached a desired percentage of capacity so as to be effective for a PD treatment. This fill volume is stored by the processor 310 and/or the portable device 402 as the fill volume parameter for use in a PD treatment for the patient.

Figure 15:
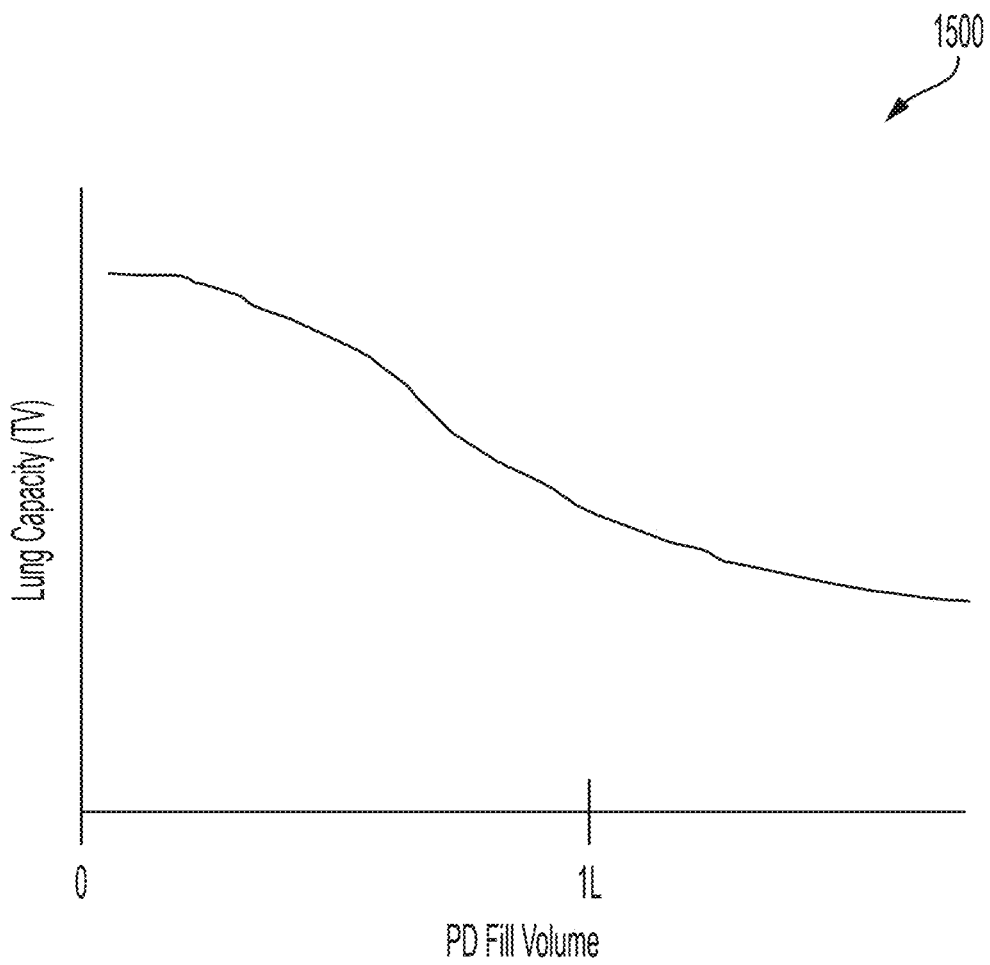
FIG. 15 is a diagram of a graph of a patient-specific correlation between lung capacity and fill volume, according to an example embodiment of the present disclosure.

A patient-specific correlation between fill volume and lung capacity may be determined and subsequently used for PD treatments. In these embodiments, a PD machine may use periodic lung capacity measurements for estimating a patient's IPP or fill volume during different phases of a PD treatment. FIG. 15 shows a graph 1500 of a patient-specific correlation between lung capacity and fill volume, according to an example embodiment of the present disclosure. The graph 1500 shows that lung capacity decreases as PD fill volume increases. Such a correlation may be useful for PD treatments where a lung capacity measurement may be used instead of attempting to estimate or directly measure a patient's IPP.

VI. CONCLUSION

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An intraperitoneal pressure ("IPP") measurement system comprising:
    a fluid container containing peritoneal dialysis ("PD") fluid;
    a transfer set and catheter in fluid communication with the fluid container and configured to fluidly communicate with a patient's peritoneal cavity to enable PD fluid to be provided to the patient's peritoneal cavity;
    a pressure sensor configured to contact the transfer set or the catheter, the pressure sensor configured to transmit output data indicative of an IPP within the patient's peritoneal cavity, the pressure sensor including
- a pressure element configured to measure a pressure imparted by a fluid within the transfer set or catheter, and
- a pressure amplifier having a first side that contacts a portion of the transfer set or catheter and a second side that contacts the pressure element, the first side having a greater diameter or surface area compared to the second side; and a processor communicatively coupled to the pressure sensor, the processor configured to
- receive the output data indicative of the IPP within the patient's peritoneal cavity, and
- at least one of use the output data indicative of the IPP to determine a fill volume parameter for a PD treatment for the patient, or cause the output data indicative of the IPP to be displayed to enable a determination of the fill volume parameter.

2. The system of claim 1, wherein the output data indicative of the IPP within the patient's peritoneal cavity corresponds to pressure measurements made by the pressure sensor during dwell intervals between when the PD fluid is provided to and removed from the patient's peritoneal cavity.

3. The system of claim 1, wherein the fluid container is placed at a head height, and the system further includes a line clamp that, when closed, occludes a flow of the PD fluid through the transfer set or catheter.

4. The system of claim 1, further comprising a pump configured to move, when activated, the PD fluid from the fluid container through the transfer set and catheter to the patient's peritoneal cavity.

5. The system of claim 1, further comprising an automated peritoneal dialysis ("APD") machine configured to provide the PD treatment for the patient using at least the fill volume parameter.

6. The system of claim 1, further comprising a force sensor included with the pressure sensor or adapted to contact the transfer set or catheter, the force sensor including at least one of an inertial sensor, a gyroscope, or an accelerometer for sensing at least one of linear or rotational acceleration in one or more axis,
wherein the force sensor is configured to output force data indicative of at least one of patient movement or pressure sensor movement.

7. The system of claim 6, wherein the processor is further configured to receive the force data and use the force data to adjust the output data indicative of the IPP to account for measurement components related to at least one of patient movement or pressure sensor movement.

8. The system of claim 1, wherein the processor is further configured to:
- compare the output data indicative of the IPP to at least one data range;
- when the comparison is outside the at least one data range, provide an indication there is an issue with at least one of the transfer set or the catheter; and
- when the comparison is within the at least one data range, use the output data indicative of the IPP to determine the fill volume parameter.

9. The system of claim 8, wherein the processor is further configured to:
- receive from the pressure sensor, second output data indicative of pressure during filling the patient's peritoneal cavity with increasing amounts of the PD fluid;
- compare the second output data indicative of the pressure during the filling of the patient's peritoneal cavity to a second data range;
- when the comparison is outside the second data range, provide an indication there is an issue with at least one of the transfer set or the catheter; and
- when the comparison is within the second data range, use the output data indicative of the IPP to determine the fill volume parameter.

10. The system of claim 1, wherein the processor is further configured to:
- receive patient information including at least one of urine output within a defined time period, food/beverage intake within a defined time period, a heart rate, or a blood pressure; and
- adjust the output data indicative of the IPP or the fill volume parameter using the patient information.

11. The system of claim 10, wherein the defined time period includes at least one of twenty-four hours or forty-eight hours prior to having the pressure sensor provide the output data indicative of the IPP of the patient.

* * * * *